US006825769B2

(12) United States Patent
Colmenarez et al.

(10) Patent No.: US 6,825,769 B2
(45) Date of Patent: Nov. 30, 2004

(54) AUTOMATIC SHUT-OFF LIGHT SYSTEM WHEN USER SLEEPS

(75) Inventors: Antonio Colmenarez, Peekskill, NY (US); Srinivas Gutta, Buchanan, NY (US); Miroslav Trajkovic, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/952,058

(22) Filed: Sep. 14, 2001

(65) Prior Publication Data

US 2003/0052789 A1 Mar. 20, 2003

(51) Int. Cl.[7] ............................................. G08B 23/00
(52) U.S. Cl. ................. 340/575; 340/573.1; 340/573.4; 340/540; 340/3.1; 434/238; 367/197; 367/198; 367/199
(58) Field of Search ............................... 340/575, 573.1, 340/573.4, 540, 3.1; 434/238; 367/197, 198, 199

(56) References Cited

U.S. PATENT DOCUMENTS

| 4,249,207 A | 2/1981 | Harman et al. ............. 358/108 |
| 5,187,657 A * | 2/1993 | Forbes ........................ 600/513 |
| 5,302,819 A * | 4/1994 | Kassies ..................... 250/222.1 |
| 5,902,250 A * | 5/1999 | Verrier et al. ............... 600/515 |
| 6,095,989 A | 8/2000 | Hay et al. .................... 600/558 |
| 6,239,706 B1 * | 5/2001 | Yoshiike et al. ........... 340/573.4 |

FOREIGN PATENT DOCUMENTS

| JP | 04052901 | * 2/1992 | ........... G05B/15/02 |
| JP | 404309365 | * 10/1992 | ........... A61M/21/02 |

* cited by examiner

Primary Examiner—Daniel J. Wu
Assistant Examiner—Tai T. Nguyen
(74) Attorney, Agent, or Firm—Gregory L. Thorne

(57) ABSTRACT

A method and system for the automatic detection of a sleeping person and for adjusting electrical power supplied to a number of electronic devices; it includes a unit for observing the behavior of a person in a predetermined area under surveillance and a unit for analyzing output data from the observing unit to determine whether the observed behavior is associated with predefined sleeping behaviors. Upon recognition that the observed behavior indicates the sleeping state of a person, the electrical power supplied to the plurality of electronic devices is selectively adjusted according to predetermined criteria.

25 Claims, 4 Drawing Sheets

AUTOMATIC SHUT-OFF LIGHT SYSTEM WHEN USER SLEEPS

BACKGROUND OF THE INVENTION

1. Field of the Invention

The present invention relates to an automatic detection system, particularly to a method and system for identifying a person falling asleep and adjusting electrical power supplied to the home appliances according to the person's default setting.

2. Description of the Related Art

It is most often the case that when a person goes to bed to sleep that person must leave the bed to turn off the light or other appliances in use. There have been some electronic devices that automatically shut off the lamp, for example, by clapping hands. However, a person may often doze without turning off the appliances and cause energy waste. Alternatively, a person may want to fall asleep as he or she watches a television program or listens to the radio or a musical audio program, or want to enjoy a certain electronic device, i.e., air condition, humidifier, etc., without the inconvenience of having to leave the bed to turn them off.

Accordingly, the present invention proposes an efficient and accurate system of automatically identifying a particular person as he or she falls asleep, then shutting off any device in use according to the person's default settings.

SUMMARY OF THE INVENTION

The present invention is directed to a method and system for providing variations in electrical power supplied to a plurality of devices in response to the detection of a sleeping person.

According to an aspect of the present invention, the method includes the steps of tracking the behavior of a person; comparing the tracked behavior with at least one of a plurality of predetermined sleeping behaviors to establish a behavior match; and, if a match is established, adjusting the electrical power supplied to the plurality of said devices according to predetermined criteria. At least one of the predetermined sleeping patterns includes recognizing when a particular person's eyelids are closed, or that a particular person is snoring or motionless.

According to another aspect of the present invention, the method includes the steps of observing the behavior of a person in a predetermined area by comparing the observed behavior with at least one of a plurality of predetermined sleeping behaviors to establish a behavior match, and if a match is found, observing at least a partial image of the face of the person containing an image of at least one eyelid. If at least one eyelid is closed, the method further selectively adjusts the electrical power supplied to the plurality of devices according to predetermined criteria.

According to another aspect of the present invention, the system capable of adjusting electrical power supplied to a plurality of devices in response to the detection of a sleeping person includes: a means for observing the behavior of the person in a predetermined area under surveillance; a means for analyzing output data from the observing means to determine whether the observed behavior is associated with predefined sleeping behaviors; a means for storing the predefined sleeping behaviors; and, a means for adjusting the electrical power supplied to the plurality of devices according to predetermined criteria.

DETAILED DESCRIPTION OF THE DRAWINGS

A more complete understanding of the method and apparatus of the present invention is available by reference to the following detailed description when taken in conjunction with the accompanying drawings wherein.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
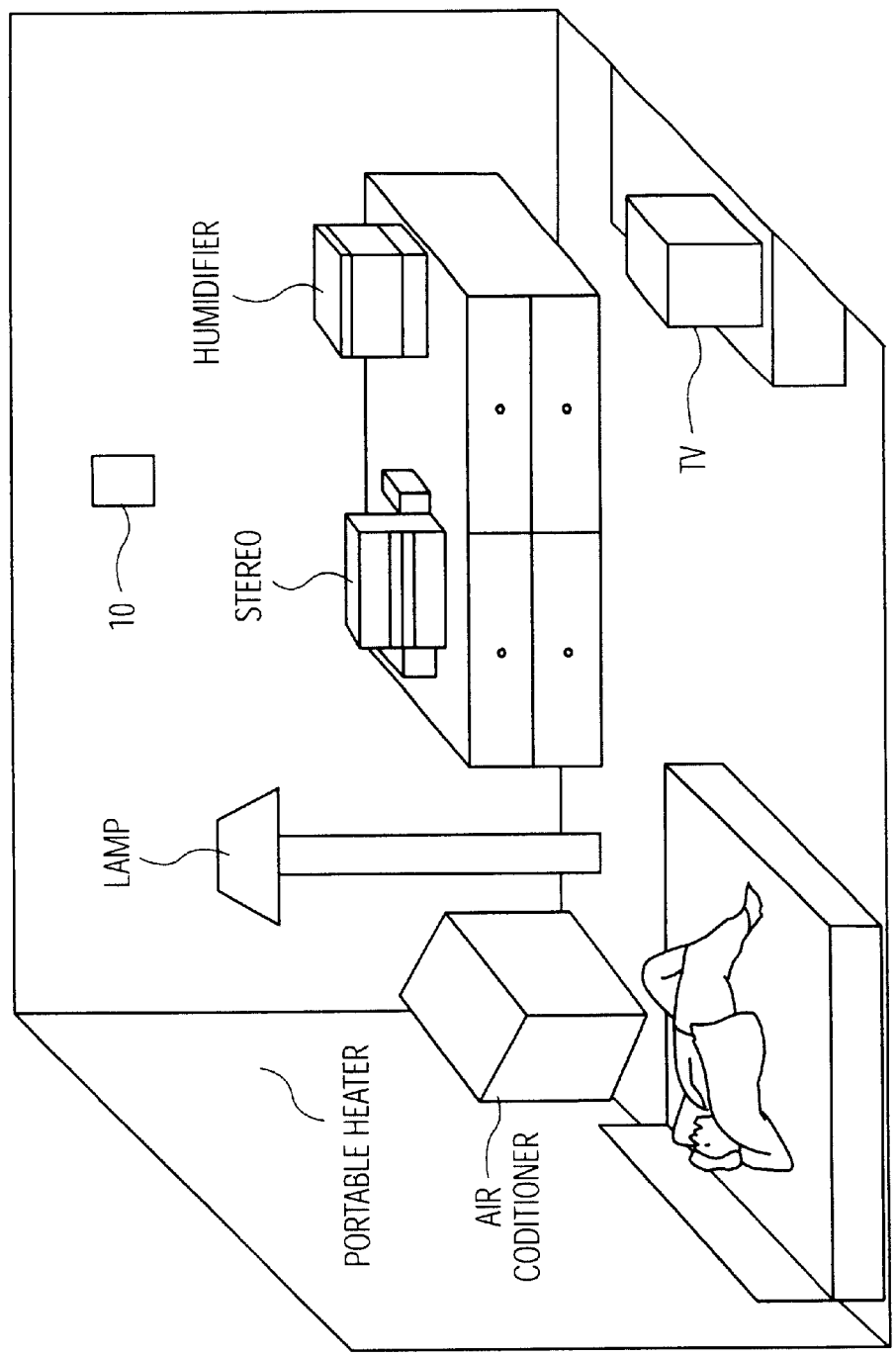
FIG. 1 is a simplified diagram illustrating an exemplary surveillance room whereto embodiments of the present invention are to be applied.

FIG. 1 is an illustrative diagram whereto embodiments of the present invention are to be applied. A detection unit 10 is provided to keep a predetermined area or room under surveillance, such that if a person is detected to be falling asleep, the detection unit 10 generates a control signal to shut off or lower the power supplied to a number of electronic devices in the room, i.e., lamp, television set, stereo system, humidifier, portable heater/air conditioner, etc. In the embodiment, the detection unit 10 allows the identification of a person falling asleep by comparing whether any behavior patterns observed by the detection unit 10 are associated with predetermined sleeping behaviors stored in a predetermined pattern recognition database. If there is a match between the observed behavior and one of the predetermined sleeping behaviors, the detection unit 10 adjusts the electrical power supplied to any one of the electronic devices in use according to predetermined criteria. That is, a user may preprogram the detection unit 10 to selectively adjust the electrical power supplied to any one or a combination of the devices coupled to the detection unit 10. For example, a user may preprogram the lamp or stereo system to shut off instantaneously or provide a variation in lighting intensity in predetermined increments upon determination that the person has fallen asleep.

Figure 2:
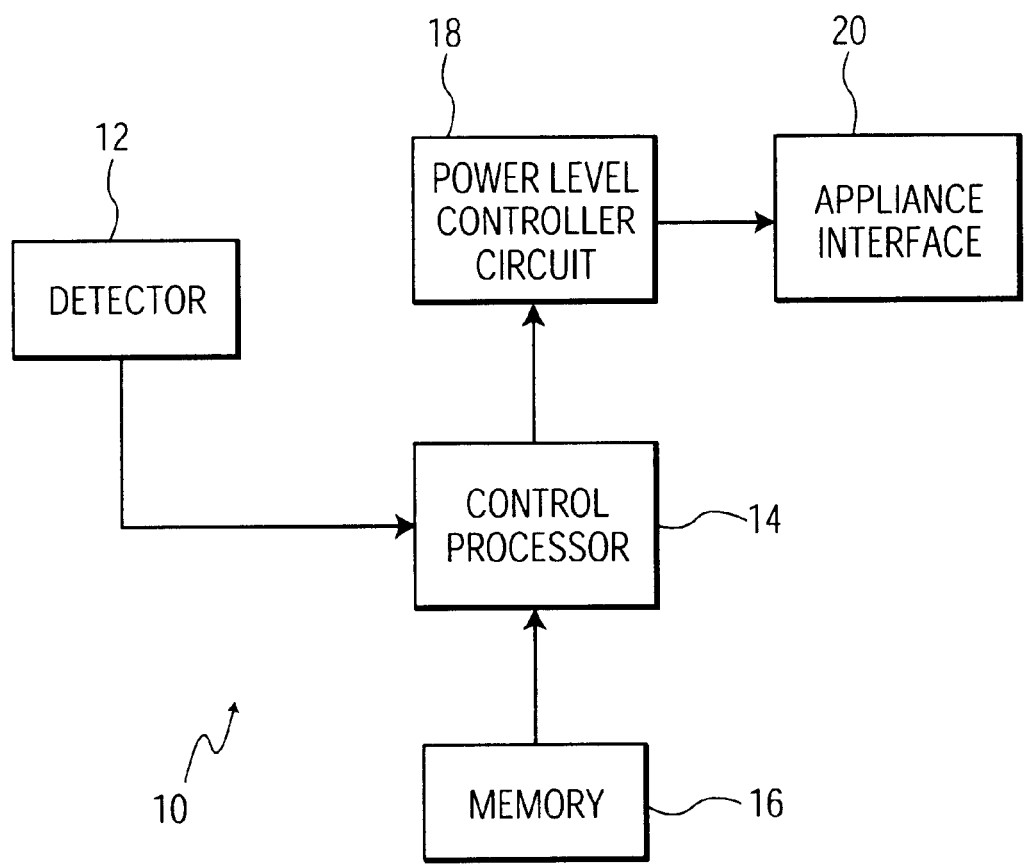
FIG. 2 is a simplified circuit block diagram showing an automatic detection apparatus according to an embodiment of the present invention.

FIG. 2 illustrates a simplified block diagram of the detection unit according to an exemplary embodiment of the present invention. The detection unit 10 includes a detector 12, a control processor 14, a memory 16, a power level controller 18, and an appliance interface. The detector 12 may include a video camera, an optical sensor, an infrared sensor that can sense the body heat, or other tracking systems that are capable of observing the human body or sensing the sounds of human activities. Thus, any number of commercially or publicly available detection systems can be utilized in various implementations in accordance with the preferred embodiment of the present invention. Under the control of the processor 14, the power level controller 18 provides variations in electrical power supplied to a plurality of electronic appliances coupled to the appliance interface 20. The memory 16 stores predetermined sleeping patterns, which are recognized as sleeping behaviors, so that a person or group of people in a particular area can be identified.

In operation, the detector 12 determines whether the person in a room is falling asleep. The behavior data detected by the detector 12 is compared to the previously pre-digitized database indicative of sleeping patterns. The processor 14 compares the detected data to establish a match with the sleeping pattern data stored in the memory 16. Although the exemplary embodiment of the present invention anticipates the use of the conventional sleeping characteristics of the person, any personal profile that is sufficiently unique to provide a reasonable probability of sleeping identification, and which is capable of being digitally represented and stored in an electronic image signal, may be utilized in the present invention.

Now, the provision of recognizing sleeping patterns to identify whether a person is asleep, according to the present invention, will be explained in a detailed description.

Figure 3:
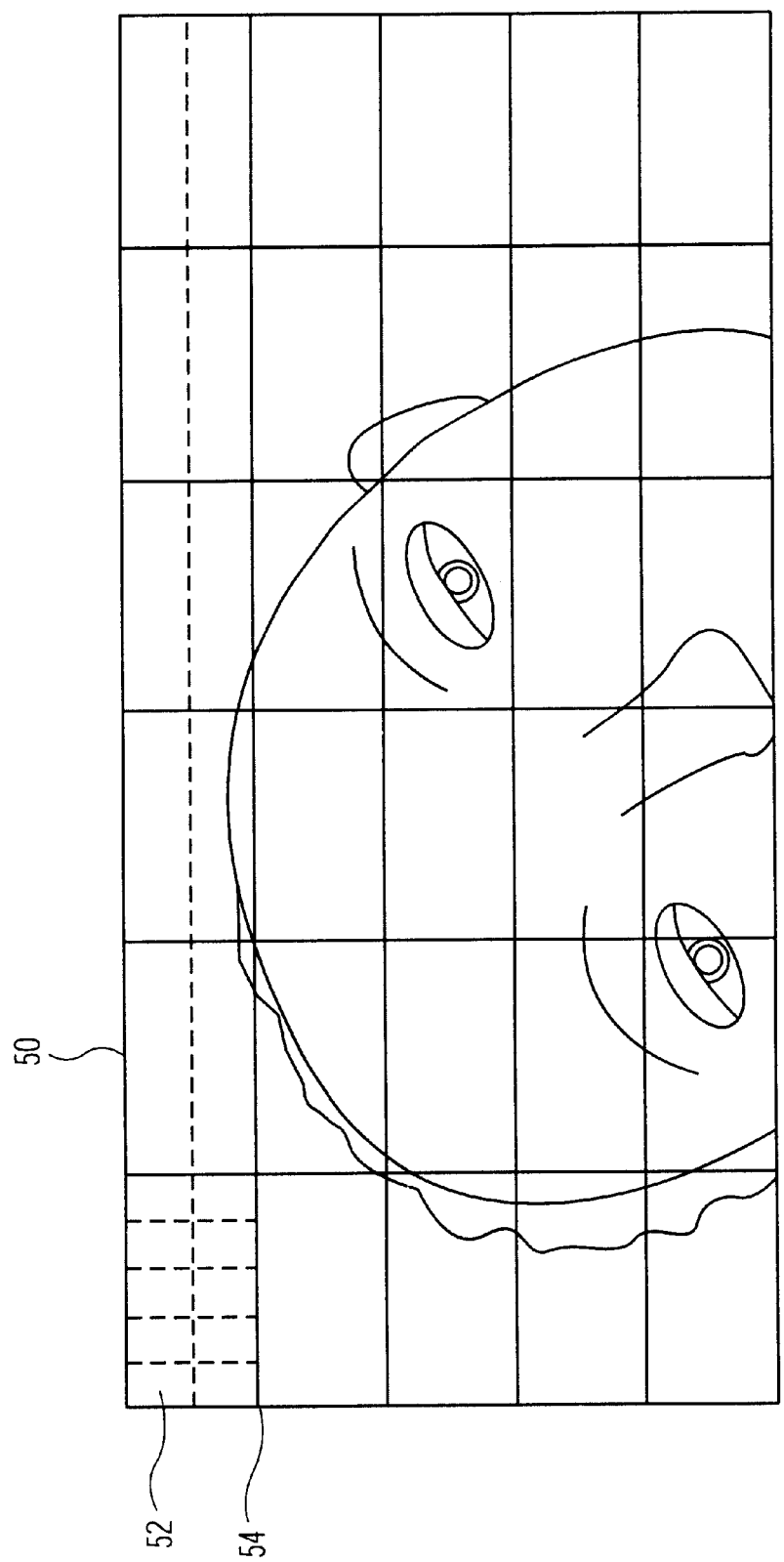
FIG. 3 is a diagram illustrating the pattern recognition function in accordance with the present invention.

FIG. 3 illustrates the technique in detecting the movement of a person in a room based on a series of frame data generated by a typical video camera. Tracking the movement of a person in a particular area and locating the eye region is well know in the art that can be performed in a variety of ways. See for example, U.S. Pat. Nos. 4,249,207 and 6,095,989, the content of which are hereby incorporated by reference. When using a video camera, for example, the area under surveillance could be divided into an array of cells as shown in FIG. 3. The content of each cell is monitored between frames for any changes in the adjacent cells, and such indication can be used to indicate the movement or non-movement of a person. If the detected person is motionless for a predetermined time period or if the eyelids are closed, it may indicate that the person is in a sleeping state. An indication of closing eyelids could be determined by dividing the aisle into an array of cells 50. The array of cells could be further subdivided (shown by 52 and 54) between, for example, near the eye region. The width of the subdivided cells also could be smaller, such that the closing of the eyelids can be more easily identified. Accordingly, sub-divided cells could be used to detect a sleeping person by observing the motionless state of the person and the closed state of the eyelids.

Figure 4:
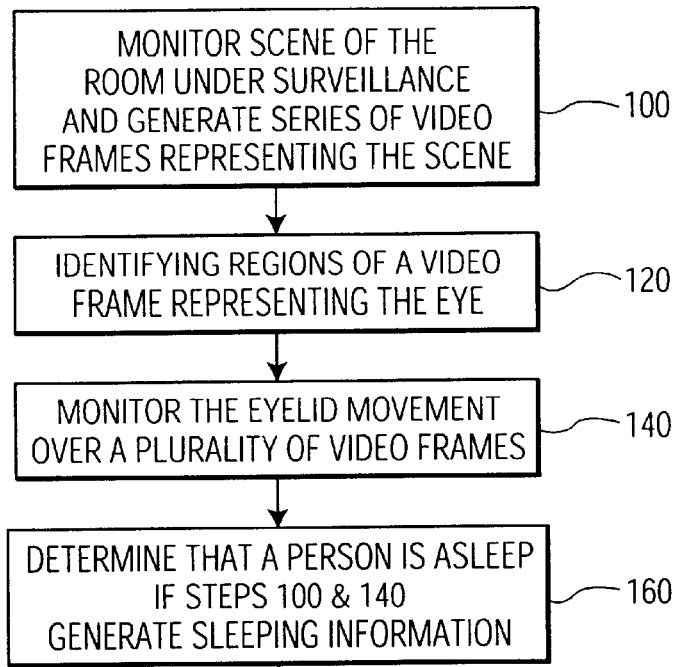
FIG. 4 is a flow chart illustrating the operation steps of shutting off an electronic device in response to an individual falling asleep according to an embodiment of the present invention; and, FIG. 5 is a flow chart explaining the process of identifying an individual falling asleep according to an embodiment of the present invention.

A method utilizing the techniques, as described in the preceding paragraph, in accordance with this invention is shown in the flow diagram of FIG. 4. The detection unit 10 initially tracks down a person in a room and generates a series of video frames in step 100. The region of the person's head, in particular to the eye area, is identified in step 120. Thereafter, the movement of the eyelids of the person is monitored over a plurality of video frames to determine whether the eyelids are closed for a predetermined timer period in step 140. If so, the processor 14 generates a control signal indicating that the person is asleep in step 160.

Figure 5:
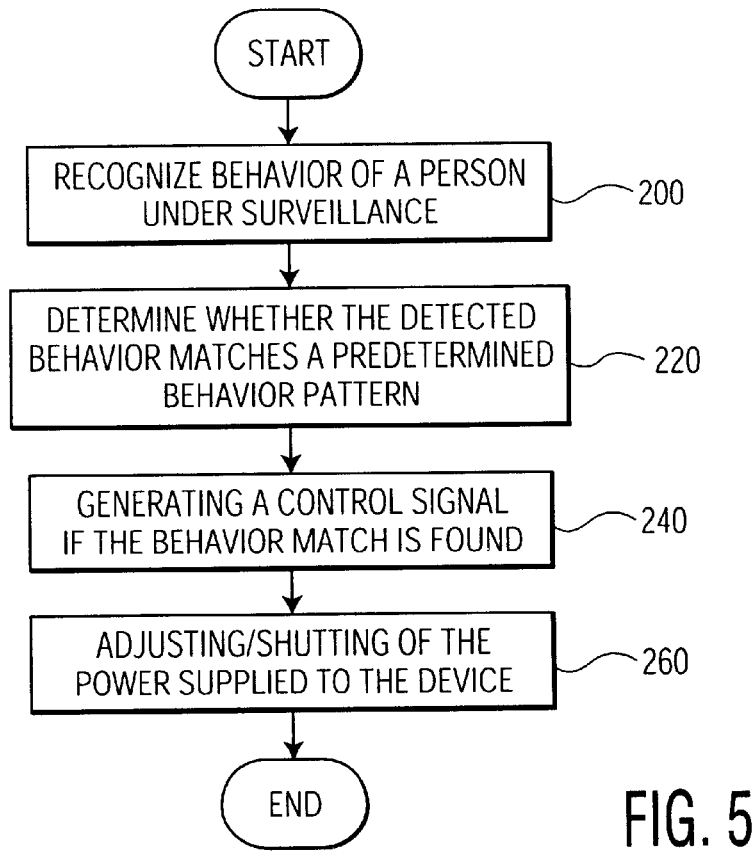

FIG. 5 is a flow diagram illustrating the operation steps performed by the present invention to selectively adjust the electrical power supplied to any one of the electronic devices. In step 200, the detection unit 10 observes the behavior of a person in an area of surveillance. The movement or the image of the person could be scanned and compared to identify whether at least one person enters the room. In step 220, there is an identification as to whether the behavior observed in step 200 is associated with at least one of a plurality of predetermined sleeping behaviors by comparing the behavior observed with a plurality of behavioral patterns stored in the memory 16 of the detection unit 10. The plurality of the behaviors in the memory 16 could be images as well as sound. For example, images of a person lying on the bed or sitting in a chair motionlessly, or the sound of snoring could be contained in the memory 16. If a match is found within a predetermined range of accuracy, the processor 14 generates a control signal to adjust the electrical power supplied to any one of the electronic devices in step 240. Thereafter, the power supplied to the electronic devices is adjusted or shut off according to the default set by the user in step 260.

It should be noted that FIGS. 4 and 5 are flow diagrams illustrating the process performed by the present invention to selectively adjust the electrical power supplied to any one of the electronic devices upon detecting a sleeping behavior. The rectangular elements indicate computer software instructions, whereas the diamond-shaped element represents computer software instructions that affect the execution of the computer software instructions represented by the rectangular blocks. Alternatively, the processing and decision blocks represent steps performed by functionally equivalent circuits such as a digital signal processor circuit or an application specific integrated circuit (ASIC). The flow diagrams illustrate the functional information that one of ordinary skill in the art needs to fabricate circuits or to generate a computer software to perform the processing required of the particular apparatus.

The previous description of the preferred embodiments is provided to enable any person skilled in the art to make or use the present invention. Various modifications to these embodiments, and other embodiments, will be readily apparent to those skilled in the art without the use of the inventive faculty. Thus, the present invention is not intended to be limited to the embodiments shown herein but is to be accorded the widest scope consistent with the principles and novel features disclosed herein.

What is claimed is:

1. A method wherein at least one of a predetermined sleeping behaviors includes recognizing when a plurality of people enter an area a predetermined under surveillance and for providing variations in electrical power supplied to a plurality of devices in response to the detection of a sleeping person, said method comprising the steps of:

tracking behavior of a person in the predetermined area the under surveillance;

comparing said tracked behavior with at least one of a plurality of predetermined sleeping behaviors to establish a behavior match; and, if a match is established, adjusting the electrical power supplied to the plurality of said devices.

2. The method according to claim 1, further comprising the step of storing the plurality of said predetermined sleeping behaviors in a memory medium.

3. The method according to claim 1, wherein at least one of the predetermined sleeping behaviors includes recognizing when a particular person's eyelids are closed.

4. The method according to claim 1, wherein at least one of the predetermined sleeping behaviors includes recognizing when a particular person is snoring.

5. The method according to claim 1, wherein at least one of the predetermined sleeping behaviors includes recognizing when a particular person is motionless for a predetermined time period.

6. The method according to claim 1, wherein the behavior of said person is tracked with cameras.

7. The method according to claim 1, wherein the behavior of said person is tracked with sensors.

8. The method according to claim 1, further comprising the step of obtaining at least a partial image of a face of the person containing an image of at least one eyelid.

9. A method wherein at least one of a predetermined sleeping behaviors includes recognizing when a plurality of people enter area a predetermined under surveillance implemented by a processor for adjusting electrical power supplied to a plurality of devices in predetermined area the under surveillance, said method comprising the steps of:

observing behavior a of a person in said predetermined area by comparing said observed behavior with at least one of a plurality of predetermined sleeping behaviors to establish a behavior match;

if a match is found, obtaining at least a partial image of a face of the person containing an image of at least one eyelid;

tracking an area around the eye region of the person to determine if said at least one eyelid is closed; and, if at least one said eyelid is closed, selectively adjusting the electrical power supplied to the plurality of said devices.

10. The method according to claim 9, if a match is not found, repeating said step of comparing said observed behavior with the plurality of said predetermined sleeping behaviors until a behavior match is established.

11. The method according to claim 9, if at least one said eyelid is not closed, repeating said step of tracking the area around the eye region until at least one said eyelid is closed.

12. The method according to claim 9, further comprising the step of storing the plurality of said predetermined sleeping behaviors in a memory medium.

13. The method according to claim 9, wherein at least one of the predetermined sleeping behaviors includes recognizing when a particular person's eyelids are closed.

14. The method according to claim 9, wherein at least one of the predetermined sleeping behaviors includes recognizing when a particular person is snoring.

15. The method according to claim 9, wherein at least one of the predetermined sleeping behaviors includes recognizing when a particular person is motionless for a predetermined time period.

16. The method according to claim 9, wherein the behavior of said person is observed with cameras.

17. The method according to claim 9, wherein the behavior of said person is observed with sensors.

18. A system wherein an memory a means includes recognizing when a plurality of individuals enter an area an under surveillance for adjusting electrical power supplied to a plurality of devices in response to a detection of a sleeping person, said system comprising:

means for observing a behavior a of a person in a predetermined area under surveillance;

means for analyzing output data from said observing means to determine whether said observed behavior is associated with predefined sleeping behaviors;

means for storing said predefined sleeping behaviors; and, means for adjusting the electrical power supplied to the plurality of said devices.

19. The system according to claim 18, further comprising means for generating a control signal indicating that said observed behavior is associated with said predefined sleeping behaviors.

20. The system according to claim 18, wherein said means for observing includes cameras.

21. The system according to claim 18, wherein said means for observing includes sensors to sense snoring sounds.

22. The system according to claim 18, wherein said memory means includes recognizing when a particular person's eyelids are in a closed state.

23. The system according to claim 18, wherein said memory means includes recognizing when a particular person is snoring.

24. The system according to claim 18, wherein said memory means includes recognizing when a particular person is motionless for a predetermined time period.

25. The system according to claim 18, further comprising means for observing at least a partial image of the face of the person containing an image of at least one eyelid.

* * * * *